United States Patent
Hederich et al.

[11] 3,959,315
[45] May 25, 1976

[54] ANTHRAQUINONE DYESTUFFS

[75] Inventors: Volker Hederich; Günter Gehrke, both of Cologne, Germany

[73] Assignee: Bayer Aktiengesellschaft, Leverkusen, Germany

[22] Filed: Apr. 29, 1974

[21] Appl. No.: 465,433

[30] Foreign Application Priority Data
Apr. 27, 1973 Germany.......................... 2321331

[52] U.S. Cl.......................... 260/346.2 M; 260/316; 260/329.2; 8/39 B; 8/39 C; 8/40
[51] Int. Cl.²............................... C07D 307/91
[58] Field of Search............... 260/346.2 M, 392.2

[56] References Cited
UNITED STATES PATENTS
2,407,704  9/1946  Kern........................... 260/346.2 M

*Primary Examiner*—Henry R. Jiles
*Assistant Examiner*—Bernard Dentz
*Attorney, Agent, or Firm*—Plumley & Tyner

[57] ABSTRACT

Anthraquinone dyestuffs of the formula

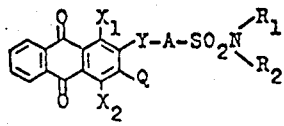

in which $X_1$ and $X_2$ denote an amino or hydroxyl group,
Y denotes a bridge member,
A denotes a heterocyclic radical

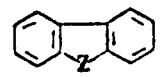

which can optionally be substituted further by non-ionic substituents,
Z denotes oxygen, sulphur or a sulphonyl, imino or alkylimino group,
Q denotes hydrogen, chlorine or bromine,
$R_1$ and $R_2$ denote hydrogen, alkyl, aralkyl, cycloalkyl, aryl or heteryl and wherein
$R_1$ and $R_2$ can also form, conjointly with the nitrogen atom, the remaining members of a heterocyclic ring as well as a process for their preparation and their use for dyeing synthetic fiber materials.

6 Claims, No Drawings

ANTHRAQUINONE DYESTUFFS

The present invention relates to anthraquinone dyestuffs of the formula

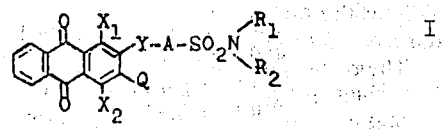

in which
$X_1$ and $X_2$ denote an amino or hydroxyl group,
Y denotes a bridge member,
A denotes a heterocyclic radical

which can optionally be substituted further by non-ionic substituents,
Z denotes oxygen, sulphur or a sulphonyl, imino or alkylimino group,
Q denotes hydrogen, chlorine or bromine,
$R_1$ and $R_2$ denote hydrogen, alkyl, aralkyl, cycloalkyl, aryl or heteryl
and wherein
$R_1$ and $R_2$ can also form, conjointly with the nitrogen atom, the remaining members of a heterocyclic ring, and to a process for their preparation and their use for dyeing synthetic fibre materials.

Suitable alkylimino groups Z are those with 1–4 C atoms. Possible bridge members Y which link the anthraquinone molecule to the benzo radical of the heterocyclic structure A are atom bridges such as —O— or —S—, and —O—alkylene—O—, —O—alkylene—S— and —O—alkylene—NH— groups, in which alkylene is a straight-chain or branched $C_{1-4}$ hydrocarbon radical which can optionally be interrupted by oxygen. The bridge members —O—CH$_2$—CH$_2$—O—, O—CH$_2$—CH$_2$—CH$_2$—O—, —O—CH$_2$—CH$_2$—CH$_2$—O—,

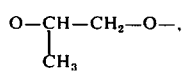

—O—CH$_2$—CH$_2$—S—, —O—CH$_2$—CH$_2$—NH— and —O—C$_2$H$_4$—$o$—$c_2$H$_4$—O —C$_2$H$_4$—O— may be mentioned as examples.

Possible non-ionic substituents in the heterocyclic radical A are halogen, such as chlorine or bromine, and $C_{1-4}$-alkyl radicals which can optionally be substituted by hydroxyl, nitrile or $C_{1-4}$-alkoxy groups. As examples there may be mentioned methyl, ethyl, propyl, isopropyl, butyl, tert.-butyl, β-cyanoethyl, β-hydroxyethyl, β-methoxypropyl, β-ethoxypropyl and β-methoxypropyl. Further non-ionic substituents are alkoxy groups with $C_{1-4}$ carbon atoms, such as, for example, methoxy, ethoxy, propoxy, isopropoxy, butoxy, isobutoxy, sec.-butoxy and tert.-butoxy, and the trifluoromethyl radical. Preferably, the heterocyclic structure A contains 0–2 non-ionic substituents. As examples of radicals $R_1$ and $R_2$ there may be mentioned hydrogen, methyl, ethyl, propyl, iso-propyl, n-butyl, iso-butyl, β-hydroxyethyl, β-chloroethyl or β-bromoethyl, β-methoxyethyl or β-ethoxyethyl, β-methylmercaptoethyl or β-methylsulphonylethyl, β-cyanoethyl, γ-hydroxypropyl, γ-methoxypropyl or γ-ethoxypropyl, ω-hydroxybutyl, 3-hydroxybutyl, 2-methyl-1,3-dihydroxypropyl, 2-methyl-1-hydroxypropyl, β-[β'-hydroxyethoxy)ethyl, benzyl, methylbenzyl, cyclohexyl or methylcyclohexyl.

If $R_1$ or $R_2$ represents an aryl radical, it is preferably a phenyl radical which can be substituted by one to two halogen atoms, such as fluorine, chlorine or bromine, nitro groups, trifluoromethyl, hydroxyl or $C_{1-4}$-alkoxy radicals, carboxyl groups or carboxylic acid amide groups, such as, for example, $C_{1-4}$-alkylcarbamoyl groups or phenylcarbamoyl groups which are optionally substituted by chlorine, $C_{1-4}$-alkyl or $C_{1-4}$-alkoxy groups, acylamino groups, such as, for example, formylamino, $C_{2-5}$-alkylcarbonylamino or benzoylamino groups, sulphonamide radicals such as, for example, $C_{1-4}$-alkanesulphamide radicals or benzenesulphamyl groups which are substituted by chlorine, $C_{1-4}$-alkyl or -alkoxy radicals, or $C_{1-4}$-alkylsulphonyl radicals. Possible heteroaryl radicals are, for example, the pyridyl, pyrrolyl, pyrimidyl, furanyl, thienyl or sulpholanyl radical. The pyrrolidinyl, piperidinyl, morpholinyl, thiomorpholinyl or thiomorpholinyl-dioxide ring may be mentioned as examples of rings, optionally interrupted by hetero-atoms, which $R_1$ and $R_2$ can form together.

Preferred dyestuffs are those of the formula

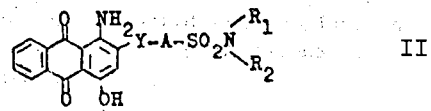

wherein Y, A, $R_1$ and $R_2$ have the indicated meaning and especially dyestuffs of the formula

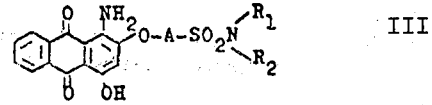

wherein A, $R_1$ and $R_2$ have the indicated meaning.

Of these, in turn, dyestuffs of particular industrial interest are those of the general formula

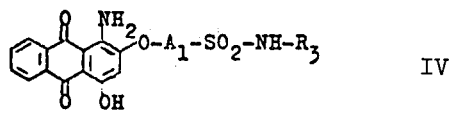

in which
$A_1$ represents the diphenylene oxide radical and
$R_3$ represents hydrogen, methyl, ethyl, hydroxyethyl, hydroxypropyl, phenyl or hydroxyphenyl.

The dyestuffs of the formula I are obtained by a reaction in which a sulphonic acid amide group

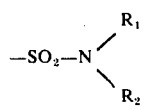

wherein $R_1$ and $R_2$ have the indicated meaning are introduced, in a manner which is in itself known, into the radical A of the compounds of the formula

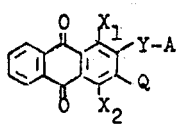

wherein $X_1$, $X_2$, Y, A and Q have the indicated meaning.

For this purpose, for example, chlorosulphonyl groups are introduced into compounds of the formula V by treatment with excess chlorosulphonic acid, optionally in the presence of thionyl chloride, at ordinary to moderately raised temperature, after which the sulphochlorides thus obtained are converted into the dyestuffs according to the invention by means of ammonia or appropriate amines used in excess, optionally in the presence of solvents, such as acetone, dioxane, N-methylpyrrolidone, dimethylsulphoxide and others, at ordinary to moderately elevated temperature (as a rule at about 10°–80°C).

Hereupon, the sulphonic acid amides thus obtained precipitate from the reaction mixture or are, if necessary, isolated in the usual manner by acidification or dilution of the reaction solution with diluents, for example with alcohols, such as methanol or ethanol, or by steam distillation of the amines.

The compounds V required for the preparation of the dyestuffs I according to the invention are obtained, in turn, by reacting anthraquinones of the formula

VI wherein
$X_1$, $X_2$ and Q have the abovementioned meaning and E represents a replaceable substituent with compounds V of the formula $$H-Y-A \qquad \text{VII}$$

wherein Y and A have the abovementioned meaning in the presence of strongly alkaline compounds, optionally in the presence of a suitable solvent, at temperatures of about 100°–160°C, preferably 120°–140°C.

The reaction is preferably carried out in an excess of VII, which can at the same time serve as the solvent.

Suitable solvents are also, for example, dimethylformamide, dimethylacetamide, dimethylsulphoxide, tetramethylenesulphone, N-methylpyrrolidone, ε-caprolactam or pyridine.

Examples of suitable strongly alkaline compounds are sodium carbonate or hydroxide or potassium carbonate or hydroxide.

Possible replaceable substituents are in particular halogen atoms such as chlorine and bromine, lower alkoxy groups and sulphonic acid groups, but preferably aryloxy groups, such as phenoxy, chlorophenoxy or methylphenoxy radicals.

Examples of suitable anthraquinones of the formula VI are: 1-amino-2-phenoxy-4-hydroxy-anthraquinone, 1-amino-2-p-chlorophenoxy-4-hydroxy-anthraquinone, 1,4-diamino-2-phenoxy-anthraquinone, 1,4-dihydroxy-2-phenoxy-anthraquinone, 1-amino-2-methoxy-4-hydroxy-anthraquinone, 1-amino-2-chloro-4-hydroxy-anthraquinone, 1-amino-4-hydroxy-anthraquinone-2-sulphonic acid, 1-amino-4-hydroxy-2,3-dibromo-anthraquinone, 1,4-diamino-2,3-dibromo-anthraquinone and 1,4-diamino-2,3-dichloro-anthraquinone.

The heterocyclic compounds of the formula VII required for the preparation of the dyestuffs according to the invention are obtainable, for example, according to K. Schimmelschmidt, A. 566 (1950), 184–206 or according to DRP 591,213.

Examples of suitable compounds of the formula VII are:

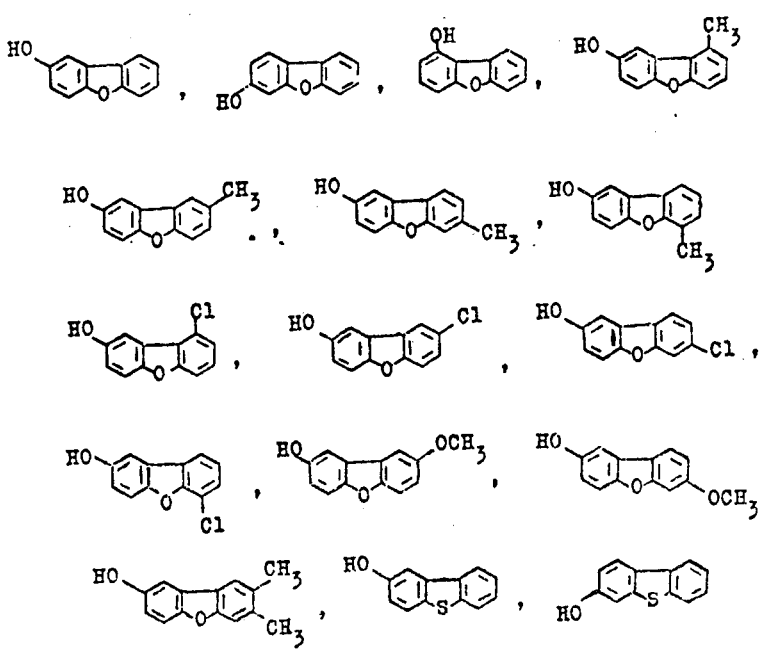

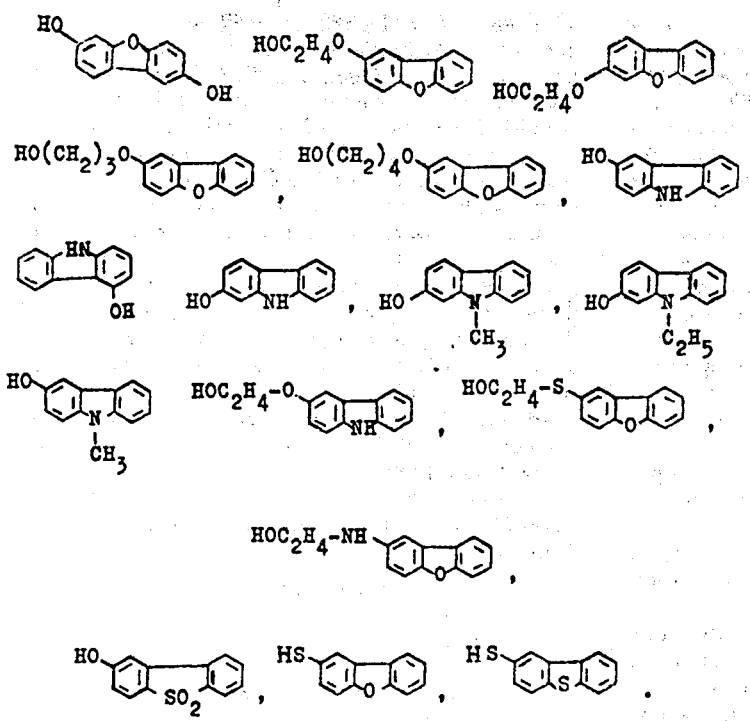

A further possible method of preparing the dyestuffs according to the invention, of the formula I, is the reaction of anthraquinones VI with compounds containing sulphonic acid amide groups, of the formula $$H-Y-A-SO_2N\begin{matrix}R_1\\\\R_2\end{matrix} \quad \text{VIII}$$

wherein Y, A, $R_1$ and $R_2$ have the indicated meaning.

The dyestuffs according to the invention, of the formula I, serve above all as disperse dyestuffs for dyeing and/or printing synthetic fibres, for example by the thermosol process, in which the dyestuffs are padded onto the fibre in a manner which is in itself known and are subsequently fixed by brief heating to temperatures of approx. 200°C.

The new dyestuffs can also be spun into synthetic fibres or be used for dyeing shaped articles, such as flexible sheets, films or rigid sheets of synthetic origin.

The new dyestuffs of the formula I, optionally used as mixtures, are very especially suitable for dyeing synthetic materials by the exhaustion process from organic water-immiscible solvents, wherein the dyestuffs are sparingly soluble.

Organic water-immiscible solvents which can be used are those of boiling point between 40° and 170°C, for example aromatic hydrocarbons, such as toluene and xylene, and halogenated hydrocarbons, especially aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1-chlorobutane, 2-chlorobutane, 1,4-dichlorobutane, 1-chloro-2-methylpropane or 2-chloro-2-methylpropane, and aliphatic fluoro-hydrocarbons and fluorochloro-hydrocarbons, such as perfluoro-n-hexane, 1,2,2-trifluorotrichloroethane and trifluoropentachloropropane, and aromatic chloro-hydrocarbons and fluoro-hydrocarbons, such as chlorobenzene, fluorobenzene, chlorotoluene and benzotrifluoride.

Tetrachloroethylene, trichloroethylene, 1,1,1-trichloroethane and 1,1,1-trichloropropane have proved particularly suitable. Mixtures of these solvents can also be used.

The dyeing liquors can contain small quantities, that is to say up to 1 per cent by weight, and preferably up to 0.5 per cent by weight, of water, relative to the weight of the organic solvents.

Furthermore, the addition of non-ionic auxiliaries to the dyeing liquors has proved of value in some cases. Possible non-ionic auxiliaries are in particular the known surface-active ethoxylation and propoxylation products of fatty alcohols, alkylphenols, fatty acid amides and fatty acids, and their mixtures. The auxiliaries are employed in an amount of 0.05 – 2 per cent by weight, based on the weight of the organic solvents. Instead of adding the auxiliaries directly to the dyeing liquors, they can also be used with advantage for working the dyestuffs into a paste and in this way be added to the dyeing liquors in the form of a paste containing the dyestuff and the auxiliary.

The synthetic fibre materials to be dyed according to the invention are above all fibre materials of polyesters, such as polyethylene terephthalate, poly-cyclohexanedimethylene terephthalate, and heterogeneous polyesters of terephthalic acid, sulphoisophthalic acid and ethylene glycol, or copolyether-ester fibres of p-hydroxybenzoic acid, terephthalic acid and ethylene glycol, cellulose triacetate, cellulose 2½-acetate and synthetic polyamides obtained from hexamethylenediamine adipate, ε-caprolactam or ω-aminoundecanoic acid, and also polyacrylonitrile and polyurethane fibre materials. The fibre materials can be in the most diverse states of processing, for example in the form of filaments, flocks, tops, yarn, piece-goods, such as woven fabrics or knitted fabrics, or made-up goods.

The dyeing according to the invention is preferably carried out in closed apparatuses, for example by introducing the fibre materials into the dyestuff dispersion at room temperature, using a liquor ratio of 1:3 to 1:30, heating the dyebath to 60°–170°C and keeping it at this temperature until the liquor is exhausted; this is generally the case after 5 to 60 minutes. After cooling to room temperature, the liquor is separated off and the fibre materials are briefly rinsed with fresh organic solvent if necessary, and freed of the adhering solvent by suction or centrifuging and subsequent drying in a stream of warm air. Using the process according to the invention it proves possible, in a simple manner, to dye synthetic fibre materials from organic solvents, with high dyestuff yields and excellent fastness properties.

The dyestuffs are used in an amount of 0.01 to 3 per cent by weight based on the weight of the fibre materials.

The anthraquinone dyestuffs to be used according to the invention are sparingly soluble in the organic watermmiscible solvents.

It should be pointed out that mixtures of the dyestuffs to be used according to the invention at times give a better dyeing yield than do the individual dyestuffs.

The parts mentioned in the examples which follow are parts by weight.

EXAMPLE 1

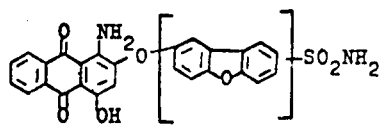

a. 250 parts of 1-amino-2-bromo-4-hydroxyanthraquinone are introduced into a melt of 1,500 parts of 2-hydroxy-dibenzofurane and 200 parts of anhydrous potassium hydroxide at 150°C. The reaction mixture is stirred for 5½ hours at 150°–160°C, 2,000 parts by volume of methanol are then cautiously added at 120°–130°C and after cooling the dyestuff which has separated out is filtered off. It is washed with 750 parts by volume of methanol and 2,000 parts by volume of hot water and after drying 321 parts of a dyestuff which melts, after recrystallisation from pyridine, at 238°–40°C, are obtained.

b. 250 parts of the dyestuff prepared according to Example 1a are introduced over the course of 1 hour into a mixture of 1,000 parts of chlorosulphonic acid and 100 parts of thionyl chloride at 10°–15°C and the whole is stirred for 1½ hours at 15°–20°C and 1½ hours at 30°–40°C. The reaction mixture is added to 7,000 parts of ice, the sulphochloride which has separated out is filtered off and the press cake is washed with ice water until a pH value of approx. 6 is reached and is then introduced into a mixture of 2,000 parts by volume of water and 400 parts by volume of concentrated ammonia, and the suspension is stirred for 6 hours at room temperature and 2 hours at 50°–60°C. After filtration, washing with water and drying, 284 parts of a compound of the formula indicated are obtained, melting at 206°–8°C after recrystallisation from glacial acetic acid.

c. 100 parts of a fabric of texturised polyethylene terephthalate fibres are introduced, without prior cleaning, into a dyebath at room temperature, which has been prepared from 1 part of dyestuff according to Example 1b — reduced to a finely divided state in the usual manner (compare, for example, DOS (German Published Specification) No. 2,104,202 = GB-PS No. 1,313,479) — and 1.000 parts of tetrachloroethylene. The bath is heated to 115°C over the course of 10 minutes whilst vigorously circulating the liquor and is kept at this temperature for 30 minutes. The liquor is then separated off and the dyed goods are rinsed with fresh solvent for 5 minutes at approx. 40°C. After separating off the rinsing liquor, the dyed goods are centrifuged and dried in a stream of air. A strong red dyeing of good fastness to washing, light and sublimation and good rub resistance is obtained.

An equivalent red dyeing was obtained in the same manner on a fabric of polycyclohexane-dimethylene terephthalate fibres.

If the tetrachloroethylene is replaced by the same amount of 1,1,2-trichloroethane, an equivalent dyeing is obtained.

EXAMPLE 2

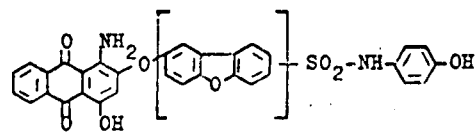

a. 3.5 parts of the intermediate product obtained according to Example 1a are converted into the sulphochloride as indicated in Example 1b. The press cake, whilst still moist, is introduced into 50 parts by volume of acetone, 2 parts of p-aminophenol are added and the mixture is stirred at room temperature until sulphochloride is no longer detectable chromatographically. After addition of 60 parts by volume of methanol and 60 parts by volume of water, the mixture is filtered and the residue is washed with methanol/water (1:2) and water. 5.3 parts of the dyestuff indicated are obtained, melting at 200°C after recrystallisation from glacial acetic acid.

b. 100 parts of poly-ε-caprolactam fibre yarn are introduced into a dyebath at room temperature, which contains 1 part of dyestuff according to Example 2a in 1,000 parts of tetrachloroethylene. The bath is warmed to 100°C over the course of 20 minutes whilst vigorously circulating the liquor and is kept at this temperature for 40 minutes. After this time, the liquor is separated off and the dyed material is briefly rinsed with fresh solvent, centrifuged and dried in a stream of air.

A clear bluish-tinged red dyeing having good fastness properties and giving a very high dyeing yield is obtained.

If the 1,000 parts of tetrachloroethylene are replaced by the same amount of 1,1,2-trichloroethane, pentachloroethane, 1,2-dichloropropane, 2-chlorobutane, 1,4-dichlorobutane, perfluoro-n-hexane, 1,2,2-trifluoro-trichloroethane, trifluoropentachloropropane, chlorobenzene, fluorobenzene, chlorotoluene or benzotrifluoride, or if instead of poly-ε-caprolactam the polyamide of aminoundecanoic acid is used, equivalent red dyeings are obtained.

EXAMPLE 3

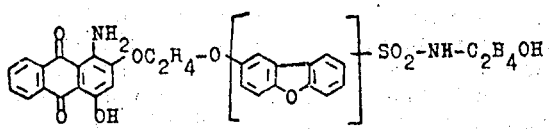

a. A mixture of 100 parts of 2-(2-hydroxyethoxy)-dibenzofurane (prepared from 2-hydroxydibenzofurane an chloroethanol or ethylene oxide), 12 parts of 1-amino-2-phenoxy-4-hydroxy anthraquinone and 2 parts of potassium hydroxide is heated, in the presence of 20 parts by volume of N-methylpyrrolidone, to 145°–150°c for 2¾ hours. 150 parts by volume of methanol and 5 parts by volume of glacial acetic acid are then added, after the mixture has cooled the dyestuff which has separated out is filtered off, and after washing with methanol and water, 16.7 parts of a dyestuff which melts at 214°–15°C after recrystallisation from N-methylpyrrolidone are obtained.

b. 5.5 parts of dyestuff according to Example 3a are introduced into a mixture of 40 parts of chlorosulphonic acid and 4 parts of thionyl chloride and the whole is stirred for 1½ hours to 15°–20°C. The mixture is then poured out onto ice and filtered, the press cake is washed with ice water and the sulphochloride, whilst still moist, is introduced into 60 parts by volume of ethanolamine. The mixture is stirred for 2 hours at room temperature and then introduced into 200 parts by volume of water, the dyestuff which has separated out is filtered off and washed with water, and after drying 7.5 parts of the compound indicated are obtained, melting at 150°–2°C after recrystallisation from N-methylpyrrolidone.

c. 50 parts of a polyester fibre fabric are introduced into a dyebath at room temperature which has been prepared from 1 part of dyestuff according to Example 3b, 1.5 parts of oleic acid ethanolamide, 1.5 parts of oleyl alcohol eicosaethylene glycol ether, 6 parts of water and 500 parts of tetrachloroethylene. The bath is heated to 120°C over the course of 10 minutes whilst vigorously circulating the liquor and is kept at this temperature for 45 minutes. After separating off the dyeing liquor, the dyed goods are rinsed with fresh solvent at 40°C and dried in a stream of air after removing the rinsing liquor. A brilliant red dyeing of good fastness to washing, light and sublimation and good rub resistance is obtained.

EXAMPLE 4

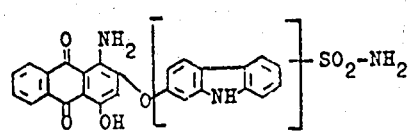

a. 10 parts of 1-amino-2-phenoxy-4-hydroxy-anthraquinone are introduced into a mixture of 80 parts of 2-hydroxycarbazole, 50 parts by volume of N-methylpyrrolidone and 2 parts of potassium hydroxide. The mixture is warmed to 150°C for 7 hours and diluted with 150 parts by volume of methanol and 5 parts by volume of glacial acetic acid, and after cooling the dyestuff which has separated off is filtered off. It is washed with methanol and water and after drying 10.4 parts of a dyestuff which melts at 286°–7°C after recrystallisation from pyridine are obtained.

b. 5 g of dyestuff according to Example 4a in 50 parts of chlorosulphonic acid and 5 parts of thionyl chloride are stirred for 20 minutes at room temperature and 1 hour at 40°–50°C. The mixture is then poured out onto 500 parts of ice, the sulphochloride is isolated in the usual manner, and the press cake, whilst still moist, is introduced into a mixture of 60 parts of water and 20 parts by volume of concentrated ammonia. After stirring for 5 hours at room temperature, the mixture is additionally warmed to 30°–40°C for 2 hours and the product is filtered off and washed with water until neutral. 5.5 parts of a dyestuff of the formula indicated are obtained.

c. 100 parts of yarn of cellulose 2½-acetate filaments are introduced into a dyebath at 22°C which has been prepared from 1 part of the dyestuff according to Example 4b, 1,000 parts of tetrachloroethylene, 1.5 parts of oleic acid ethanolamide, 1.5 parts of oleyl alcohol eicosa-ethylene glycol ether and 6 parts of water. The bath is heated to 78°C over the course of 20 minutes and kept at this temperature for 45 minutes. After separating off the dyeing liquor, the dyed goods are rinsed with fresh tetrachloroethylene and freed from the adhering solvent by suction and drying in a stream of air. A clear bluish-tinged red dyeing of good fastness properties is obtained.

EXAMPLE 5

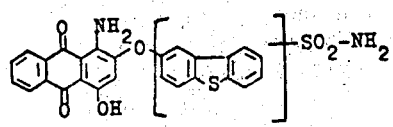

a. 50 parts of 3-hydroxy-diphenylene sulphide (prepared according to DRP 606,350), 5 parts of anhydrous potash and 6.5 parts of 1-amino-2-bromo-4-hydroxy-anthraquinone are warmed to 160°–5°C for 2¼ hours. The mixture is then cooled to 120°–130°C, 70 parts by volume of methanol and 5 parts by volume of glacial acetic acid are added carefully and after cooling the dyestuff which has separated out is filtered off. After recrystallisation from N-methyl-pyrrolidone, the dyestuff melts at 233°–4°C.

b. 5 parts of dyestuff according to Example 5a are converted into the sulphonamide in accordance with the instructions of Example 4b. 5.6 parts of a dyestuff of the indicated formula, melting at 309°–13°C after recrystallisation from pyridine, are obtained analogously.

c. The same dyestuff is obtained if 1-amino-2-bromo-4-hydroxy-anthraquinone is reacted with 3-hydroxy-diphenylene-sulphide-sulphonamide.

d. 100 parts of fiber yarn of polyhexamethylenediamine adipate fibers are introduced into a dyebath at room temperature, which has been prepared from 1 part of the dyestuff according to Example 5b in 1,000 parts of tetrachloroethylene. The bath is heated to 100°C over the course of 20 minutes whilst vigorously circulating the liquor and is kept at this temperature for 45 minutes. The liquor is then separated off and the fabric is rinsed with fresh tetrachloroethylene at 40°C. After separating off the rinsing liquor, the dyed goods are freed of adhering solvent by centrifuging and drying in a stream of air. A clear bluish-tinged red dyeing of good fastness properties is obtained, the dyeing yield being very high.

11

If the tetrachloroethylene is replaced by the same amount of 1,1,2-trichloroethane, an equivalent dyeing is obtained.

Similar dyeings are also obtained if instead of polyhexamethylenediamine adipate fibres, fibres of anionically modified polyethylene terephthalate (Dacron 64) or anionically modified polyhexamethylenediamine adipate (Nylon T 844) or polyacrylonitrile are used.

EXAMPLE 6

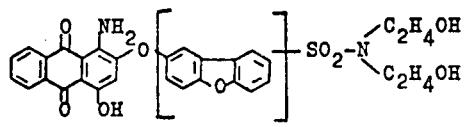

a. 5 parts of dyestuff according to Example 1a are converted into the sulphochloride in accordance with the instructions of Example 1b. The press cake, whilst still moist, is introduced into 40 parts by volume of diethanolamine whilst cooling and the mixture is stirred for 1 ¾ hours at room temperature. It is then poured into 100 parts of water and the dyestuff which has separated out is filtered off. After washing with water, and drying, 5.3 parts of the compound indicated are obtained, melting at 195°–200°C after recrystallisation from pyridine.

b. The same dyestuff as described in Example 6a is obtained if the moist sulphochloride is introduced into a mixture of 5 parts of diethanolamine in 50 parts of water and 5 parts of sodium carbonate and this reaction mixture is stirred for 4 hours at room temperature and subsequently for 1 hour at 30°–40°C.

c. 100 parts of a fabric of triacetate fibres are introduced into a dyeing bath at room temperature which has been prepared from 1 part of the dyestuff according to Example 6a and 1,000 parts of tetrachloroethylene. The bath is heated to 110°C over the course of 20 minutes whilst vigorously circulating the liquor and is kept at this temperature for 45 minutes. The liquor is then separated off and the fabric is rinsed with fresh tetrachloroethylene at 40°C. After separating off the rinsing liquor, the dyed goods are freed from the adhering solvent by centrifuging, and drying in a stream of air. A strong red dyeing having good fastness properties is obtained.

EXAMPLE 7

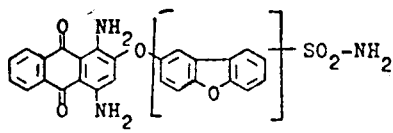

a. 125 parts of 2-hydroxy-dibenzofurane, 10 parts of anhydrous potash, 15 parts of 1-amino-2-bromo-4-p-tosylamino-anthraquinone and 25 parts of ε-caprolactam are heated to 155°–60°C for 1½ hours. The mixture is allowed to cool to 120°–130°C, the reaction product is caused to separate out by carefully adding 200 parts by volume of methanol and 10 parts by volume of glacial acetic acid, and after cooling, filtration and washing with methanol and water 17.6 parts of a dyestuff which melts at 260°–1°C after recrystallisation from pyridine are obtained.

12 b. 10 g of dyestuff according to Example 7a are introduced into a mixture of 80 parts of chlorosulphonic acid and 8 parts of thionyl chloride at 10°–15°C. The reaction mixture is stirred for 1½ hours at 15°–20°C and poured onto 400 parts of ice, the mixture is filtered, the residue is washed with ice water and the moist press cake is introduced into a mixture of 40 parts of water and 20 parts by volume of concentrated ammonia. The whole is stirred for 4 hours at room temperature and then for 1 hour at 40°–50°C, and the dyestuff is filtered off. After washing with water, and drying, 8.6 parts of the compound indicated are obtained, melting at 196°–9°C after recrystallisation from anisole.

c. 100 parts of a fabric of texturised polyethylene terephthalate fibres are introduced, without prior cleaning, into a dyebath at room temperature which has been prepared from 1 part of the dyestuff according to Example 7b and 1,000 parts of tetrachloroethylene. The bath is heated to 115°C over the course of 10 minutes, whilst vigorously circulating the liquor, and is kept at this temperature for 30 minutes. The liquor is then separated off and the dyed goods are rinsed with fresh solvent for 5 minutes at approx. 40°C. After separating off the rinsing liquor, the dyed goods are centrifuged and dried in a stream of air. A strong clear violet dyeing is obtained, which is distinguished by good fastness to washing and light, good fastness to sublimation and good rub resistance.

An equivalent violet dyeing was obtained in the same manner on a fabric of polycyclohexane-dimethylene terephthalate fibres or cellulose triacetate fibres.

EXAMPLE 8

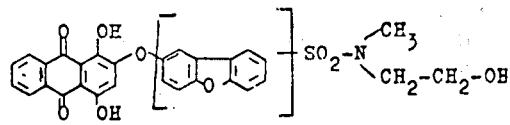

a. A melt of 125 parts of 2-hydroxy-dibenzofurane, 10 parts of anhydrous potash and 15 parts of 2-bromoquinizarine is warmed to 155°–160°C for 2 ¼ hours. It is then diluted with 150 parts by volume of methanol and 10 parts by volume of glacial acetic acid, the dyestuff which has separated out is filtered off and after washing with methanol and water, 17.3 parts of a compound which melts at 231°–2°C after recrystallisation from pyridine are obtained.

b. 10 parts of the dyestuff according to Example 8a are converted, in the manner described above, into the sulphochloride, which is introduced, as a press cake moist with water, into 50 parts of methylaminoethanol, whilst cooling. The mixture is stirred for 1½ hours at room temperature and diluted with 50 parts by volume of methanol and 100 parts of water, and the dyestuff which has separated out is filtered off. 5.0 parts of the compound indicated are obtained, melting at 163°–67°C after recrystallisation from glacial acetic acid.

c. 100 parts of a fabric of anionically modified polyethylene terephthalate (Dacron 64) are dyed for 30 minutes at 115°C in a dyebath of 1 part of the dyestuff described in Example 8b, 3 parts of oleic acid ethanolamide, 3 parts of oleyl alcohol heptaethylene glycol ether, 12 parts of water and 1,600 parts of tetrachloroethylene. After rinsing with fresh tetrachloroethylene and drying, a strong orange dyeing of good fastness to sublimation, washing and light is obtained.

Examples 9–86

The dyestuffs listed in the table are prepared analogously to the reactions described in Example 1–8, from the corresponding anthraquinone derivatives — via their sulphochlorides — and suitable amines; the dyestuffs give the shade indicated on woven fabrics or knitted fabrics of polyester, polyamide, triacetate, polyurethane or polyolefine fibres.

EXAMPLE 9–86

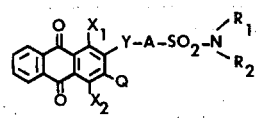

| Example | $X_1$ | $X_2$ | Q | Y—A— | $SO_2N\!\!<\!\!^{R_1}_{R_2}$ | Shade |
|---|---|---|---|---|---|---|
| 9 | $NH_2$ | OH | H | dibenzofuranyl (O) | $SO_2NH$—$CH_3$ | red |
| 10 | " | " | " | " | $SO_2NH$—$C_2H_5$ | " |
| 11 | " | " | " | " | $SO_2N(CH_3)_2$ | " |
| 12 | " | " | " | " | $SO_2NHC_2H_4OH$ | " |
| 13 | " | " | " | " | $SO_2N(C_2H_4OH)_2$ | " |
| 14 | " | " | " | " | $SO_2N\!\!<\!\!^{CH_3}_{C_2H_4OH}$ | " |
| 15 | " | " | " | " | $SO_2N\!\!-\!\!\text{morpholino}$ | " |
| 16 | " | " | " | " | $SO_2NH(CH_2)_3$—OH | " |
| 17 | " | " | " | " | $SO_2NH$—$C(CH_2OH)_2$ $\mid$ $CH_3$ | " |
| 18 | " | " | " | dibenzofuranyl (O) | $SO_2$—$NH$—$(CH_2)_2$—$CH$—$OH$ $\mid$ $CH_3$ | " |
| 19 | " | " | " | dibenzofuranyl (O) | $SO_2NH_2$ | " |
| 20 | " | " | " | " | $SO_2NH(CH_2)_3OH$ | " |
| 21 | " | " | " | " | $SO_2NH$—$C_6H_4$—$Cl$ | " |
| 22 | " | " | " | dibenzofuranyl (O) | $SO_2NH_2$ | " |
| 23 | " | " | " | methyl-benzothiophenyl (S, $CH_3$) | $SO_2NH_2$ | " |
| 24 | " | " | " | dibenzothiophenyl (O, S) | $SO_2NH_2$ | " |
| 25 | " | " | " | $OC_2H_4O$—benzothiophenyl | $SO_2NH_2$ | " |
| 26 | " | " | " | dibenzo-$SO_2$-furanyl (O, $SO_2$) | $SO_2NH_2$ | " |
| 27 | " | " | " | dibenzo-$SO_2$-furanyl (O, $SO_2$) | $SO_2NHC_2H_4OH$ | " |
| 28 | " | " | " | dibenzo-$SO_2$-furanyl (O, $SO_2$) | $SO_2NH$—$C_6H_5$ | " |
| 29 | " | " | " | $OC_2H_4O$—dibenzofuranyl | $SO_2N\!\!<\!\!^{CH_3}_{C_2H_4OH}$ | " |
| 30 | " | " | " | S-dibenzofuranyl (S, O) | $SO_2N\!\!-\!\!\text{pyrrolidino}$ | violet |

-continued

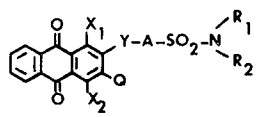

| Example | X₁ | X₂ | Q | Y—A— | SO₂N⟨R₁/R₂ | Shade |
|---|---|---|---|---|---|---|
| 31 | '' | '' | '' |  | SO₂NHC₄H₉(n) | '' |
| 32 | '' | '' | '' |  | SO₂NH₂ | '' |
| 33 | '' | '' | '' | O(CH₂)₃O-dibenzofuran | SO₂NH-cyclohexyl | '' |
| 34 | '' | '' | '' | O(CH₂)₄O-dibenzofuran | SO₂NH₂ | '' |
| 35 | '' | '' | '' | OC₂H₄-NH-dibenzofuran | SO₂NH₂ | '' |
| 36 | '' | '' | '' | OC₂H₄-S-dibenzofuran | SO₂NH-C₆H₄-OH | '' |
| 37 | '' | '' | '' | S-carbazolyl | SO₂NH₂ | '' |
| 38 | '' | '' | '' | S-carbazolyl | SO₂NHC₂H₄OH | '' |
| 39 | '' | '' | '' | O-carbazolyl | SO₂NHC₃H₆OH | red |
| 40 | '' | '' | '' | '' | SO₂N(C₂H₄OH)₂ | '' |
| 41 | '' | '' | '' | '' | SO₂NH-C₆H₄-OH | '' |
| 42 | '' | '' | '' | '' | SO₂NH-C₆H₄-OH (meta) | '' |
| 43 | '' | '' | '' | '' | SO₂NH-C₆H₄-OCH₃ | '' |
| 44 | '' | '' | '' | '' | SO₂NH-C₆H₃(CH₃)₂ | '' |
| 45 | '' | '' | '' | O-carbazolyl | SO₂NHC₂H₄OH | '' |
| 46 | '' | '' | '' | '' | SO₂NHC₃H₆OH | '' |
| 47 | '' | '' | '' | '' | SO₂N(CH₃)(C₂H₄OH) | '' |
| 48 | '' | '' | '' | O-(N-methyl)carbazolyl | SO₂NH₂ | '' |
| 49 | '' | '' | '' | '' | SO₂NHC₂H₄OH | '' |
| 50 | '' | '' | '' | '' | SO₂NH-C₆H₄-OH | '' |
| 51 | '' | '' | '' | O-(N-methyl)carbazolyl | SO₂NH₂ | '' |
| 52 | '' | '' | '' | '' | SO₂N(CH₃)(C₂H₄OH) | '' |
| 53 | '' | '' | '' | O-(N-ethyl)carbazolyl | SO₂NH₂ | '' |

-continued

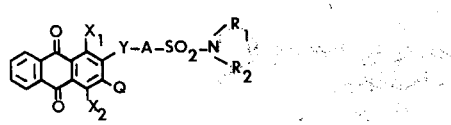

| Example | X₁ | X₂ | Q | Y—A— | SO₂N(R₁)(R₂) | Shade |
|---|---|---|---|---|---|---|
| 54 | '' | '' | '' | carbazole-N-C₂H₅ | SO₂N(C₂H₄OH)₂ | '' |
| 55 | '' | '' | '' | '' | SO₂NHC₃H₆OH | '' |
| 56 | '' | '' | '' | indolinone (NH, =O) | SO₂NH₂ | '' |
| 57 | '' | '' | '' | dibenzofuran-OH | SO₂NH₂ | '' |
| 58 | '' | '' | Cl | dibenzofuran-CH₃ | SO₂NH₂ | '' |
| 59 | '' | '' | H | dibenzofuran-CH₃ | SO₂NH₂ | '' |
| 60 | '' | '' | '' | dibenzofuran-CH₃ | SO₂NH–C₆H₄–OH | '' |
| 61 | '' | '' | '' | dibenzofuran-(CH₃)₂ | SO₂NHC₃H₆OH | '' |
| 62 | '' | '' | '' | benzo-dibenzofuran | SO₂NH₂ | '' |
| 63 | '' | '' | '' | benzo-dibenzofuran | SO₂NH₂ | '' |
| 64 | '' | '' | '' | benzo-dibenzofuran | SO₂N(CH₃)₂ | '' |
| 65 | '' | '' | '' | dibenzofuran-OCH₃ | SO₂NHCH₃ | '' |
| 66 | '' | '' | '' | dibenzofuran-OCH₃ | SO₂NH₂ | '' |
| 67 | '' | '' | '' | dibenzofuran-OCH₃ | SO₂NH–C₆H₄–OH | '' |

-continued

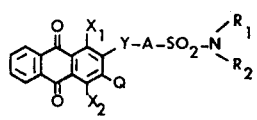

| Example | X₁ | X₂ | Q | Y—A— | SO₂N⟨R₁/R₂ | Shade |
|---|---|---|---|---|---|---|
| 68 | " | " | " | dibenzofuran-NH₂ | SO₂NH₂ | " |
| 69 | " | " | Br | chloro-dibenzofuran | SO₂NH₂ | " |
| 70 | " | " | Cl | chloro-dibenzofuran | SO₂NHCH₃ | " |
| 71 | " | " | H | chloro-dibenzofuran | SO₂NH—⟨phenyl⟩—OH | " |
| 72 | " | " | " | chloro-dibenzofuran | SO₂NHC₂H₄OH | " |
| 73 | " | " | " | dichloro-dibenzofuran | SO₂NH₂ | " |
| 74 | " | NH₂ | " | dibenzofuran | SO₂NHCH₃ | violet |
| 75 | " | " | " | dibenzofuran | SO₂NHC₂H₄OH | " |
| 76 | " | " | " | dibenzofuran | SO₂—NH—⟨phenyl⟩—OH | " |
| 77 | " | " | " | dibenzothiophene | SO₂NH₂ | " |
| 78 | " | " | " | dibenzothiophene | SO₂N(C₂H₄OH)₂ | " |
| 79 | OH | " | " | dibenzofuran | SO₂NH₂ | red |
| 80 | " | " | " | OC₂H₄O-dibenzofuran | SO₂NH₂ | " |
| 81 | " | " | " | OC₂H₄O-dibenzothiophene | SO₂N(CH₃)₂ | " |
| 82 | " | OH | " | dibenzofuran | | orange |
| 83 | NH₂ | " | Br | dibenzofuran | SO₂NHC₂H₄OH | " |
| 84 | " | " | H | carbazole | SO₂NH₂ | " |

-continued

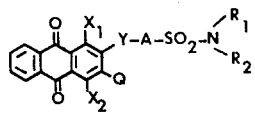

| Example | $X_1$ | $X_2$ | Q | Y—A— | $SO_2N\genfrac{}{}{0pt}{}{R_1}{R_2}$ | Shade |
|---|---|---|---|---|---|---|
| 85 | '' | '' | '' | 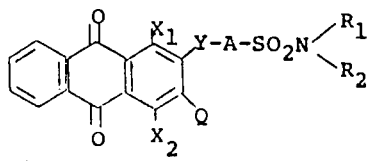 | $SO_2NH_2$ | '' |
| 86 | '' | $NH_2$ | '' | 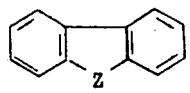 | $SO_2NCH_3$<br>$CH_2CH_2OH$ | blue-violet |

We claim:
1. An anthraquinone dyestuff of the formula

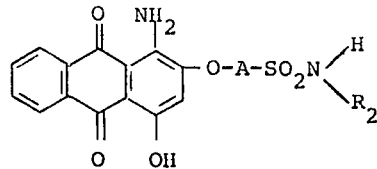

in which
$X_1$ and $X_2$ are amino or hydroxyl;
Y is a bridge member selected from the group consisting of —O—, —S—, —O—alkylene—O—, —O—alkylene—S—, —O—alkylene—NH—, in which alkylene is a $C_1$—$C_4$— hydrocarbon or $C_1$—$C_4$—hydrocarbon interrupted by 0;
A is the radical

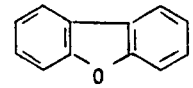

containing up to 2 non-ionic substituents selected from the group consisting of halogen; $C_1$—$C_4$—alkyl; $C_1$—$C_4$—alkyl substituted by hydroxyl, —CN or $C_1$—$C_4$—alkoxy; and $C_1$—$C_4$—alkoxy;
Z is —O— or —S—;
Q is hydrogen, chlorine or bromine;
$R_1$ and $R_2$ are hydrogen; $C_1$—$C_4$—alkyl; β-hydroxyethyl; β-chloroethyl; β-bromoethyl; β-methoxyethyl; β-ethoxyethyl; β-methylmercaptoethyl; β-methylsulphonylethyl; β-cyanoethyl; γ-hydroxypropyl; γ-methoxypropyl; γ-ethoxypropyl; ω-hydroxybutyl; 3-hydroxybutyl; 2-methyl-1,3-dihydroxypropyl; 2-methyl-1-hydroxypropyl; β-[β'-hydroxyethoxy) ethyl; benzyl; methyl-benzyl; cyclohexyl; methyl-cyclohexyl; phenyl; or phenyl mono-substituted or di-substituted by a member selected from the group consisting of halogen, nitro, trifluoromethyl, hydroxy, $C_1$—$C_4$alkoxy, carboxyl, $C_1$—$C_4$—alkylcabamoyl, phenylcarbamoyl, phenylcarbamoyl substituted by chlorine, $C_1$—$C_4$—alkyl or $C_1$—$C_4$—alkoxy, formylamino, $C_2$—$C_5$—alkylcarbonylamino, benzoylamino, $C_1$—$C_4$—alkanesulfamide, benzenesulfamoyl and benzenesulfamoyl substituted by chlorine, $C_1$—$C_4$—alkyl, $C_1$—$C_4$—alkoxy, or $C_1$—$C_4$—alkylsulfonyl.

2. An anthraquinone dyestuff of claim 1 in which Z is —O—.

3. An anthraquinone dyestuff having the formula

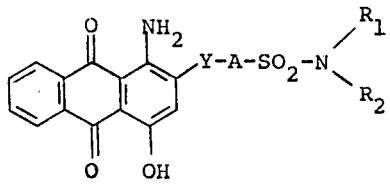

in which
A is

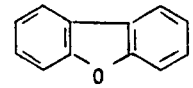

and $R_2$ is H, methyl, ethyl, hydroxyethyl, hydroxypropyl, phenyl or hydroxyphenyl.

4. An anthraquinone dyestuff of claim 3 in which $R_2$ is H.

5. An anthraquinone dyestuff of claim 1 having the formula

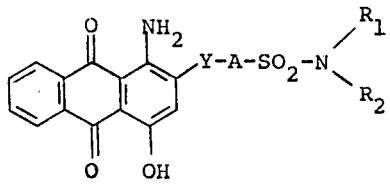

6. An anthraquinone of claim 1 in which Y is 0.

* * * * *